(12) United States Patent
Pacholik et al.

(10) Patent No.: US 8,553,324 B2
(45) Date of Patent: Oct. 8, 2013

(54) MICROSCOPE HAVING INTERNAL FOCUSING

(75) Inventors: Joerg Pacholik, Kunitz (DE); Marco Hanft, Jena (DE); Dieter Huhse, Berlin (DE)

(73) Assignee: Carl Zeiss Microscopy GmbH, Jena (DE)

( * ) Notice: Subject to any disclaimer, the term of this patent is extended or adjusted under 35 U.S.C. 154(b) by 432 days.

(21) Appl. No.: 12/673,682

(22) PCT Filed: Aug. 6, 2008

(86) PCT No.: PCT/EP2008/006457
§ 371 (c)(1),
(2), (4) Date: Mar. 17, 2010

(87) PCT Pub. No.: WO2009/021659
PCT Pub. Date: Feb. 19, 2009

(65) Prior Publication Data
US 2010/0214653 A1 Aug. 26, 2010

(30) Foreign Application Priority Data
Aug. 16, 2007 (DE) .......................... 10 2007 038 579

(51) Int. Cl.
*G02B 21/00* (2006.01)
(52) U.S. Cl.
USPC ........................................................ 359/382
(58) Field of Classification Search
USPC .................. 359/368, 382; 250/201.3
See application file for complete search history.

(56) References Cited

U.S. PATENT DOCUMENTS

| | | | |
|---|---|---|---|
| 5,856,879 A * | 1/1999 | Suzuki et al. | 359/210.1 |
| 6,167,173 A * | 12/2000 | Schoeppe et al. | 385/33 |
| 7,002,737 B1 | 2/2006 | Akiyama et al. | |
| 2003/0103263 A1 * | 6/2003 | Engelhardt et al. | 359/380 |
| 2005/0046936 A1 | 3/2005 | Dixon et al. | |

FOREIGN PATENT DOCUMENTS

| | | |
|---|---|---|
| DE | 195 46 746 | 6/1996 |
| DE | 10 2005 013 949 | 9/2006 |
| DE | 10 2005 034 441 | 2/2007 |

(Continued)

OTHER PUBLICATIONS

Notification of Transmittal of Translation of the International Preliminary Report on Patentability dated Mar. 2, 2010; The International Bureau of WIPO, 1211 Geneva 20, Switzerland.

*Primary Examiner* — Alessandro Amari
*Assistant Examiner* — Jie Lei
(74) *Attorney, Agent, or Firm* — Frommer Lawrence & Haug LLP

(57) ABSTRACT

The invention relates to a laser scanning microscope with a scanner and a microscope objective, and to a control method for such a microscope. In order to obtain sharp imaging of the sample in a laser scanning microscope, the distance between the microscope objective and the sample is usually varied for adjusting the focus position. However, relative movements between the objective and the sample can be problematic. In view of the costly special objective, internal focusing of the objective is a disadvantageous solution. An improved laser scanning microscope should make it possible to sharply image a sample with standard objectives without relative movement between the microscope objective and sample. According to the invention, a tube lens is provided which is displaceable along the optical axis, and the focus position is adjustable relative to a front optical element of the microscope objective by adjusting the tube lens.

14 Claims, 4 Drawing Sheets

(56) References Cited

FOREIGN PATENT DOCUMENTS

| | | |
|---|---|---|
| EP | 1 115 021 | 7/2001 |
| EP | 1 319 968 | 6/2003 |
| EP | 1 617 250 | 1/2006 |
| EP | 1 617 271 | 1/2006 |
| EP | 1 657 581 | 5/2006 |

* cited by examiner

MICROSCOPE HAVING INTERNAL FOCUSING

The present application claims priority from PCT Patent Application No. PCT/EP2008/006457 filed on Aug. 6, 2008, which claims priority from German Patent Application No. 10 2007 038 579.1 filed on Aug. 16, 2007, the disclosure of which is incorporated herein by reference in its entirety.

BACKGROUND OF THE INVENTION

1. Field of the Invention

The invention is directed to a laser scanning microscope and to a control method for a laser scanning microscope of this kind.

2. Description of Related Art

In order to obtain sharp imaging of the sample in a laser scanning microscope, the distance between the microscope objective and the sample is usually varied to adjust the focus position. To this end, either the sample stage with the sample or the microscope objective can be moved. It is also possible to combine the two movements.

However, the relative movements between the objective and the sample are problematic under some circumstances. For example, in electrophysiological experiments, a large number of delicate contacts are connected to the sample. A movement of the sample stage could cause these contacts to be torn out and, for this reason, is generally ruled out for fixing the focus position. Aside from this, movement of the objective may also be ruled out, for example, when contacts are guided past close to the objective or when the objective is immersed in a specimen liquid.

So-called internal focusing of objectives is known in microscopes in the prior art. For example, DE 10 2005 034 441 A1 shows a microscope objective with an adjusting device by means of which an optical element inside the objective is displaceable along the optical axis in such a way that the focus position is displaced in direction of the optical axis relative to the front element of the objective.

Sharp imaging can be achieved without relative movement of the objective and sample by means of internal focusing of the objective. However, the required special objective is extremely costly.

SUMMARY OF THE INVENTION

Therefore, it is the object of the invention to provide a laser scanning microscope and a method for controlling the latter which also makes possible a sharp imaging of a sample with standard objectives without relative movement of the microscope objective and sample.

This object is met by a laser scanning microscope having a scanner, a microscope objective, and a tube lens which is adjustable along an optical axis of the microscope. A focus position of this microscope is adjustable relative to a front optical element of the microscope objective by adjusting the tube lens.

This object is also met by a control method for the above laser scanning microscope, where an optical section of a sample is scanned by means of the scanner. The focus position is subsequently adjusted by adjusting the tube lens. Then, the process is repeated. In this method, a movement of the scanner is influenced based on a given correction value for an imaging scale of the adjusted focus position in such a way that all of the optical sections of the sample are recorded with approximately the same imaging scale.

Advantageous embodiments of the invention are indicated in the dependent claims.

According to the invention, a laser scanning microscope has a scanner, a microscope objective, and a tube lens which is adjustable along the optical axis, the focus position being adjustable relative to a front optical element of the microscope objective by adjusting the tube lens. Within the meaning of the invention, the term adjustable tube lens also includes any adjustable optical system acting in a corresponding manner which is arranged between the microscope objective and the scanner in the microscope beam path.

Since the tube lens is arranged and can be adjusted outside the microscope objective, the microscope can advantageously be provided with a standard objective. A sharp imaging of the sample can nevertheless be obtained without relative movement between the microscope objective and sample.

In a preferred embodiment, the laser scanning microscope is outfitted with a control unit which repeatedly scans an optical section of a sample by means of the scanner, and a different focus position can be adjusted subsequently by displacing the tube lens. In this way, a stack of optical sections from different focus distances can advantageously be recorded in a z-scan without relative movement between the microscope objective and sample. In a z-scan of this kind, the control unit preferably determines a plurality of discrete focus positions step by step over a depth range of the sample and, in each focus position, scans a respective optical section as part of a z-stack recording. In this way, a z-stack can be recorded in an automated manner.

Surprisingly, it was found that a laser scanning microscope with an aperture between 0.45 and 0.53, in particular an aperture of 0.45 or 0.53, and/or with an immersion medium having a refractive index between 1.31 and 1.36 can adjust the focus position in a large depth range of 200 μm.

A disadvantage of a z-scan by means of internal focusing consists in that the imaging scale changes when the focus position is displaced because the magnification is determined not only by the focal distance ratio between the tube lens and the microscope objective but also by the distance of the respective section plane from the microscope objective and by the distance between the microscope objective and the tube lens. Accordingly, quantitative evaluations of the section recordings, for example, comparisons of data from different sample depths, are problematic. Therefore, when a uniform imaging scale is required, the sections must be scaled differently prior to further use by means of image processing algorithms, which is time-consuming.

This disadvantage is circumvented with an embodiment form in which the control unit influences a movement of the scanner based on a given correction value for an imaging scale of the adjusted focus position in such a way that all of the optical sections can be recorded with approximately the same imaging scale. When recording an optical section, for example, the scanners are deflected on one or both scanning axes with increasing depth of the focus position with changed amplitude in order to compensate for the change in imaging scale. A lookup table with correction values for different focus positions which can be calculated beforehand or determined in calibration passes is preferably stored in the control unit. Intermediate values can then be determined, for example, by interpolation. Different correction values can be provided for both scan axes for the same focus distance. A set of a plurality of correction values can also be provided for a correction function for every focus position.

In a further development of this embodiment form, a laser scanning microscope has, in addition to or in place of an adjustable tube lens, an optical element which is displaceable along the optical axis in the microscope objective or collimating optics which are displaceable along the optical axis and by means of which the focus position can be adjusted by the control unit. The advantageous inventive correction of the varying imaging scale can also be used with more complex arrangements.

An intermediate image plane between the microscope objective and a scanning objective advisably has a constant position relative to the scanning objective, in particular also relative to the microscope objective.

The control method according to the invention is preferably carried out by the above-mentioned control unit. Alternatively, the control method may also be implemented in some other way.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Corresponding parts have identical reference numbers in all of the drawings.

Figure 1:
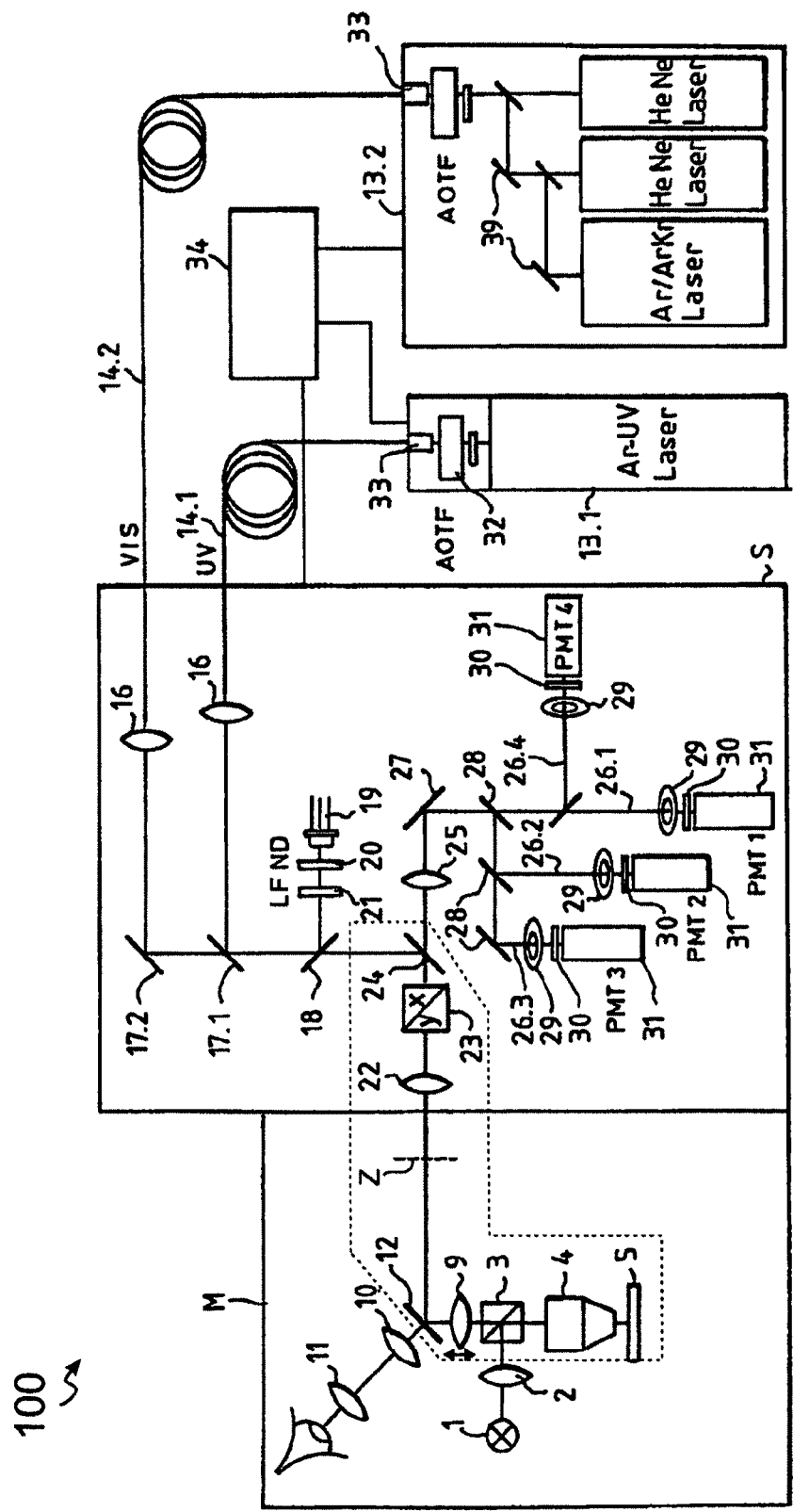
FIG. 1 shows a schematic view of a microscope with an adjustable tube lens.

FIG. 1 shows a microscope 100 schematically. It comprises a microscope unit M and a scan head S which share a common optical interface by means of an intermediate imaging in an intermediate image plane Z. The microscope beam path of the microscope unit M comprises a light source 1, illumination optics 2, a beamsplitter 3, a microscope objective with water immersion (n=1.33), a tube lens 9 which is adjustable along the optical axis, the observation beam path with an ocular tube lens 10 and an eyepiece 11, and a beamsplitter 12 for coupling in the scanning beam from the scan head S. A sample 5 to be examined is arranged on a sample stage, not shown, of the microscope 100 under the microscope objective.

Laser modules 13.1, 13.2 provide, for example, four lasers which are connected by light-conducting fibers 14.1, 14.2 to the laser input-coupling unit of the scan head S. Coupling into the light-conducting fibers 14.1, 14.2 is carried out by collimating optics 16 and beam deflecting elements 17.1, 17.2. A monitoring beam path is reflected out in direction of a monitor diode 19 by means of a semitransparent mirror 18. Line filters 21 and neutral filters 20 which are advantageously arranged on a rotatable filter wheel, not shown, are disposed in front of this monitor diode 19.

The actual scanning unit comprises a scanning objective 22, scanner 23, main beamsplitter 24 and shared imaging optics 25 for detection channels 26.1-26.4. A deflecting prism 27 behind the imaging optics 25 reflects the radiation coming from the sample 5 in direction of dichroic beamsplitters 28 in the convergent beam path of the imaging optics 25. Pinholes 29 whose diameter can be changed individually for each detection channel 26.1-26.4 and emission filters 30 and suitable receiver elements 31 (in this case, for example, secondary electron multipliers—PMTs) are arranged downstream of the imaging optics 25. In further embodiments (not shown), the beamsplitters 28 can be constructed as splitter wheels with a plurality of positions which can be switched through mechanically by stepper motors.

Single-wavelength lasers and multi-wavelength lasers which can be coupled into the fiber 14.2 individually or in combination via an AOTF are provided in the laser module 13.2. In alternative embodiment forms (not shown), coupling in can also be carried out via a plurality of fibers in parallel whose radiation is mixed on the microscope side by color combiners after passing through adapting optics. Mixing of the radiation of different lasers at the fiber input is also possible and can be carried out by means of the exchangeable and switchable splitter mirrors 39 which are shown schematically.

UV radiation is coupled into the glass fiber 14.1, preferably a single-mode glass fiber, by means of an AOTF 32 serving as a beam deflector. If the beam should not impinge on the fiber input, it is deflected from the fiber input (e.g., in direction of a light trap (not shown)) by means of the AOTF 32. The input-coupling optics 33 for coupling in the laser radiation has lens systems, not shown, whose focal length is determined by the beam cross section of the lasers and the numerical aperture required for optimal input coupling. The laser radiation exiting divergently from the end of the fibers 14.1, 14.2 at the scan unit S is collimated to an infinite beam by the collimating optics 16.

A central control unit 34 controls the variable structural component parts such as tube lens 9, scanner 23, AOTF 32, and splitter mirrors 39. At the same time, it provides the interface for operating controls and display elements (not shown) and enables a user in particular to manipulate the variable structural component parts (e.g., by means of a connected microcomputer (not shown)). The variable structural component parts can also be controlled automatically by the control unit 34 in automatic sequences.

The distance between the sharply imaged planes within the sample 5 and the microscope objective 4 can be changed by displacing the tube lens 9 along the optical axis without having to move the microscope objective 4 or sample 5. This makes its possible in particular to record optical sections at different depths.

Figure 2:
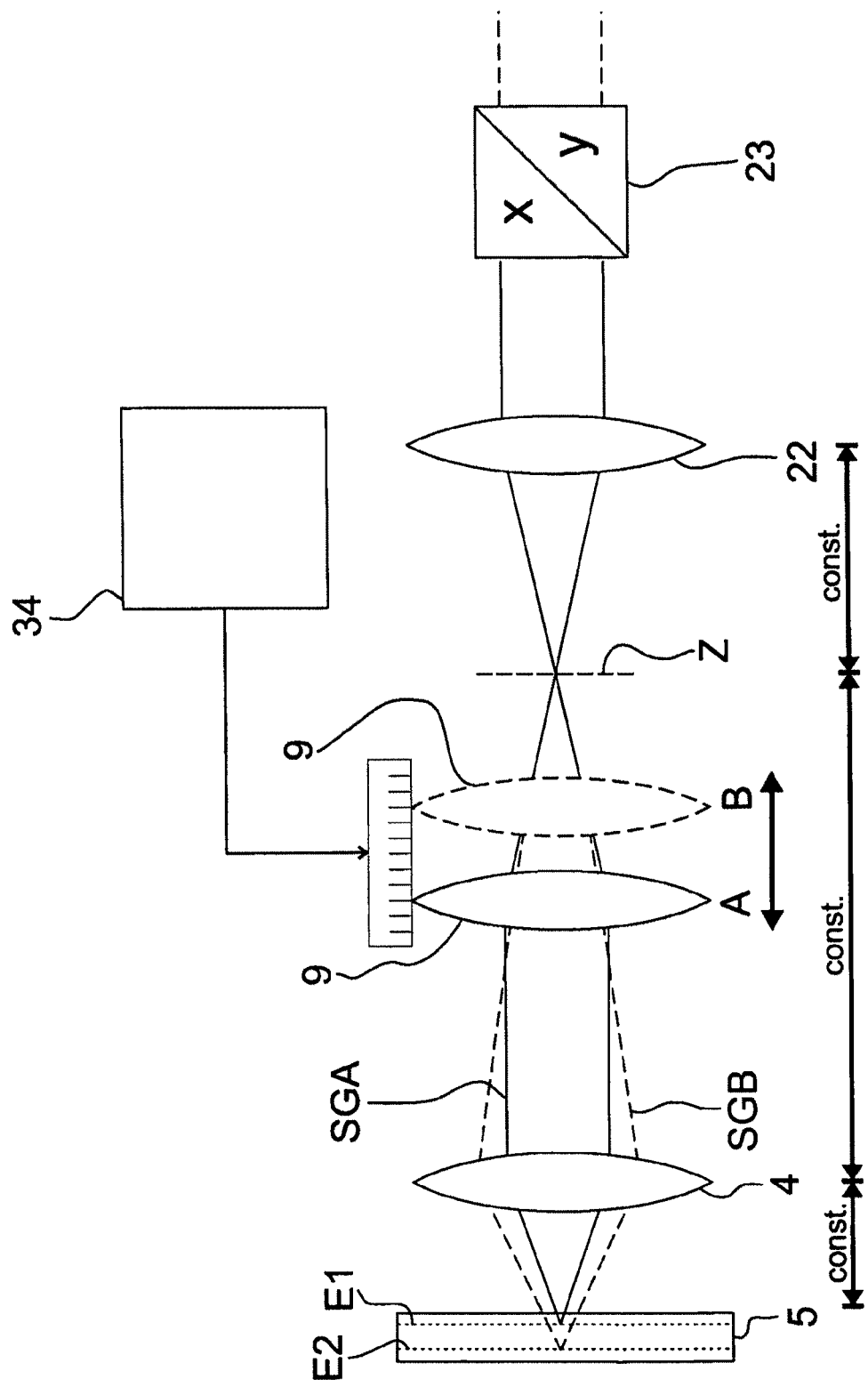
FIG. 2 shows a section from the beam path of the microscope for two different positions of the tube lens.

FIG. 2 shows the area enclosed by dashed lines in FIG. 1 without the beamsplitters 12, 24. The effects of a displacement of the tube lens 9 between two positions A and B taken by way of example are shown schematically referring to two (alternative) beam paths SGA, SGB between the scanner 23 and sample 5. The position of the intermediate image plane Z is identical for all of the positions of the tube lens 9 with respect to the scanning objective 22 and with respect to the microscope objective 4. The distance between the sample 5 and microscope objective 4 is also constant. The beam path between the tube lens 9 and the microscope objective or sample 5 changes as the position of the tube lens 9 changes. The deviations are shown in an exaggerated manner in order to show the differences between the beam paths A and B more clearly. Accordingly, the opening angle shown in the drawing is not true to scale. In position A of the tube lens 9, the focus lies in a near-surface plane E1 of the sample 5. When the tube lens 9 is displaced into position B, the focus moves into the near-surface plane E2.

This can be made use of to record a z-stack of optical sections. The control unit 34 moves the focus (e.g., in discrete steps) over a given depth range of the sample by adjusting the tube lens 9. In every discrete focus position, the tube lens 9 is halted for a scanning process and a corresponding section is recorded in sharp imaging and stored. The z-stack can be evaluated as a three-dimensional image in a known manner.

Because of the increased distance from the microscope objective, the imaging scale of the microscope 100 in position A and in the positions between position A and position B is greater than in position B. This results in different imaging scales within a z-stack. The optical sections of a z-stack can be converted to a uniform imaging scale by software using image processing algorithms.

Figure 3:
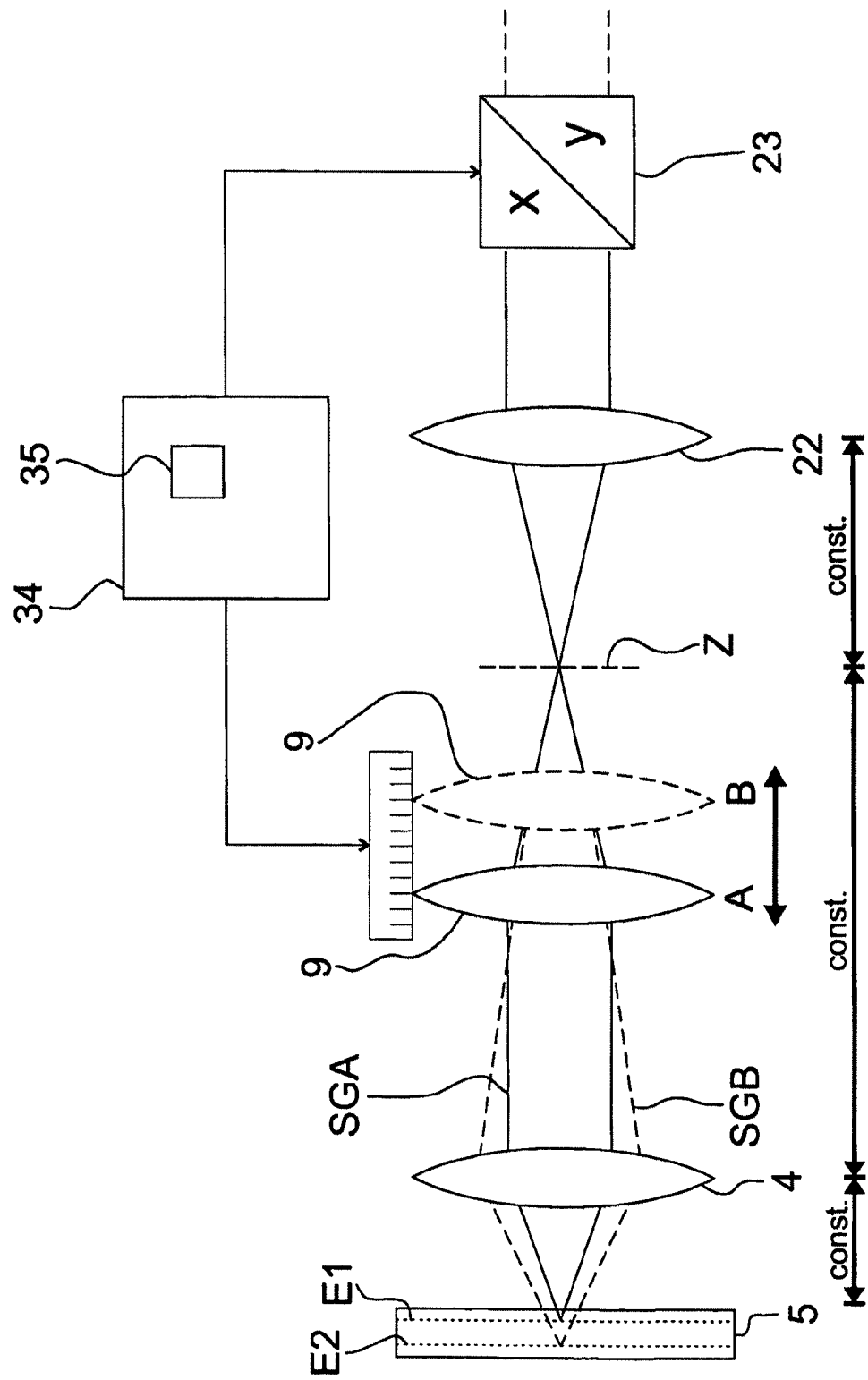
FIG. 3 shows the same section from the beam path of the microscope with additional correction of the scanning movement.

Corresponding to FIG. 2, FIG. 3 shows a beam path section of a special embodiment form of the microscope 100 in which the different imaging scales are compensated already during the recording of a z-stack by influencing the movement of the scanner 23 when recording an optical section. To this end, the control unit 34 is provided with a lookup table 35 in which sets of previously determined correction values for the imaging scales in a plurality of focus distances are stored.

Figure 4:
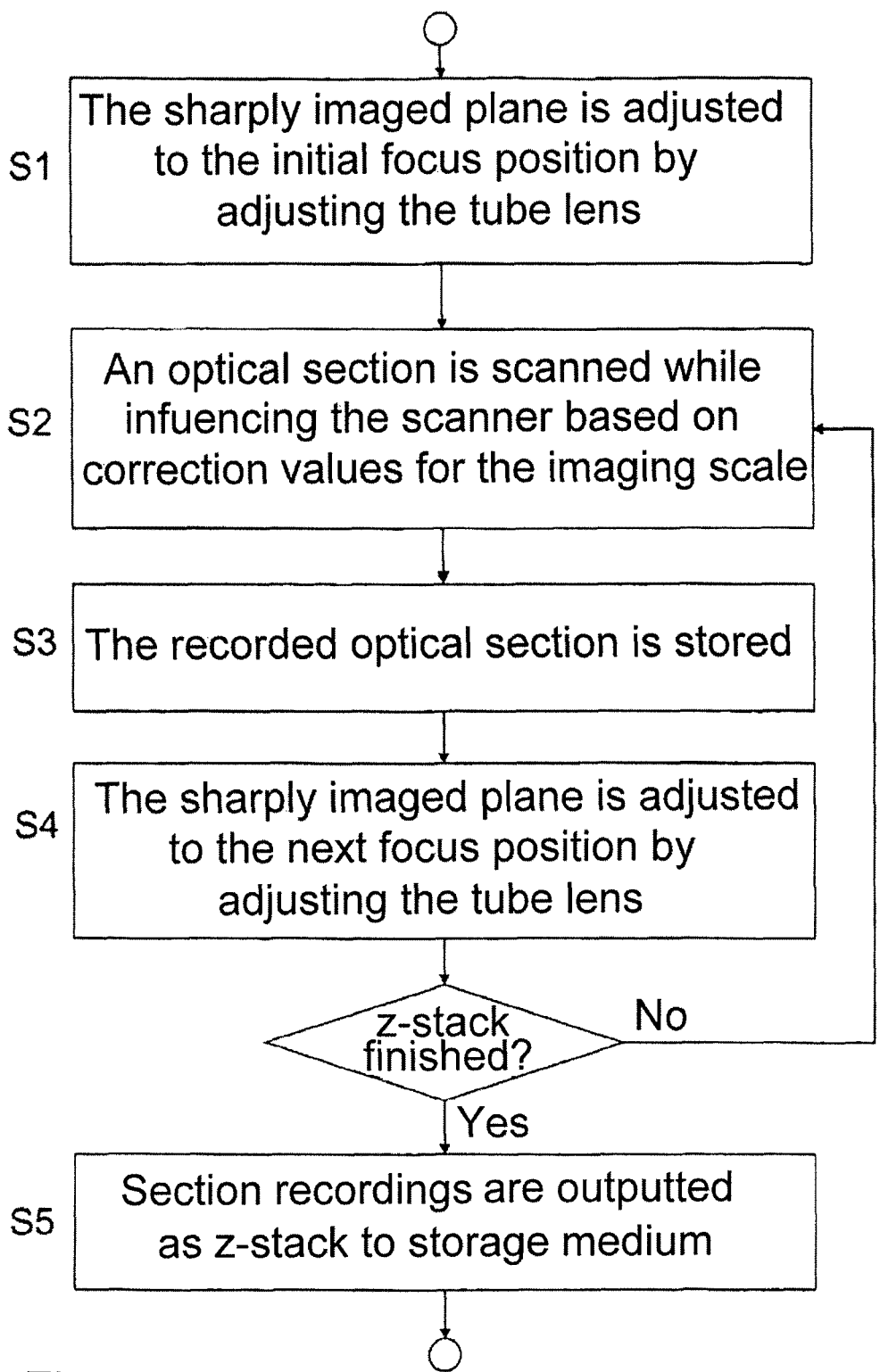
FIG. 4 shows a flowchart showing the control method.

FIG. 4 shows the sequence of the control method. To record a z-stack of corrected optical sections, an initial focus position which can be selected by a user is first adjusted in the sample by the control unit 34 in step S1 by displacing the tube lens 9.

In step S2, the sample is scanned transverse to the optical axis of the microscope 100 in a known manner. In so doing, the regular movement of the scanner 23, in other words, the scanner mirror (not shown), is manipulated. This is carried out in that the amplitude of the mirror movement is modified based on the correction values stored for the focus distance in question. For example, there is a smaller mirror deflection for a greater focus distance (i.e., a focus position deeper in the sample 5 at which there is a greater imaging scale). Accordingly, the greater imaging scale can be compensated. In further embodiments (not shown), the scanner mirror can also carry out a more complex movement. The necessary correction values can be determined by theoretical optics calculations and/or calibrating measurements.

Finally, in step S3 the recorded optical section is stored. In step S4, the control unit 34 adjusts the next focus position. If it is determined that the z-stack has not yet been traversed completely, the method advances to step S2.

Otherwise, in step S5 the z-stack is read out, for example, to a storage medium, and the process is terminated. Alternatively or in addition, the z-stack can be transferred via an interface to a microcomputer for further processing or evaluation.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMBERS 1 light source
2 illumination optics
3 beam splitter
4 microscope objective
5 sample
9 tube lens
10 ocular tube lens
11 eyepiece
12 beamsplitter
13.1, 13.2 lasers
14 light-conducting fibers
16 collimating optics
17.1, 17.2 beam deflecting element
18 semitransparent mirror
19 monitor diode
20 neutral filter
21 line filter
22 scanning objective
23 scanner
24 main beamsplitter
25 imaging optics
26.1-26.4 detection channels
27 deflecting prism
28 dichroic beamsplitter
29 pinhole
30 emission filter
31 receiver element
32 AOTF
33 coupling optics
34 control unit
35 lookup table
39 beamsplitter
M microscope unit
S scan head
E1 near-surface focus plane
E2 near-surface focus plane
A, B position of the tube lens
SGA beam path in position A of the tube lens
SGB beam path in position B of the tube lens
Z intermediate image plane

The invention claimed is:

1. A laser scanning microscope comprising:
a seamier; and
a microscope objective;
further comprising at least one of:
a tube lens which is adjustable along an optical axis of the microscope;
an optical element which is adjustable along the optical axis in the microscope objective; and
collimating optics which are displaceable along the optical axis;
wherein a focus position of the microscope is adjustable relative to a front optical element of the microscope objective by adjusting the tube lens, the optical element, or the collimating optics; and
wherein, using a given correction value for an imaging scale of the adjusted focus position, a control unit influences a movement of the scanner in such a way that different imaging scales are compensated for during recording of optical sections and the optical sections can be recorded with an approximately identical imaging scale independent from the focus position.

2. The laser scanning microscope according to claim 1; wherein the control unit adapts an amplitude of the movement of the scanner to an imaging scale of the focus position based on the correction value.

3. The laser scanning microscope according to claim 1;
wherein the tube lens, the optical element, or the collimating optics are displaceable along the optical axis and by means of which the focus position can be adjusted by the control unit.

4. The laser scanning microscope according to claim 1;
wherein an intermediate image plane between the microscope objective and a scanning objective has a constant position relative to the scanning objective.

5. The laser scanning microscope according to claim 1, further comprising:
a control unit which repeatedly scans an optical section of a sample by means of the scanner, and subsequently adjusts a different focus position by adjusting the tube lens, the optical element, or the collimating optics.

6. The laser scanning microscope according to claim 5;
wherein the control unit adjusts a plurality of discrete focus positions step by step over a depth range of the sample, and, in each focus position, scans a respective optical section as part of a stack recording.

7. The laser scanning microscope according to claim 5;
wherein the control unit influences a movement of the scanner based on a given correction value for an imaging scale of the adjusted focus position in such a way that all of the optical sections can be recorded with approximately the same imaging scale.

8. The laser scanning microscope according to claim 7;
wherein when influencing the movement of the scanner based on the correction value, the control unit adapts an amplitude of the movement of the scanner to an imaging scale of the focus position.

9. The laser scanning microscope according to claim 7, further comprising:
wherein the tube lens, the optical element, or the collimating optics are displaceable along the optical axis and by means of which the focus position can be adjusted by the control unit.

10. The laser scanning microscope according to claim 1;
wherein the microscope has a numerical aperture between 0.45 and 0.53, and/or an immersion medium having a refractive index between 1.31 and 1.36.

11. A control method for a laser scanning microscope with a scanner and a microscope objective, and further including at least one of (1) a tube lens which is adjustable along an optical axis of the microscope, (2) an optical element which is adjustable along the optical axis in the microscope objective, and (3) collimating optics which are displaceable along the optical axis, a focus position of the microscope being adjustable relative to a front optical element of the microscope objective by adjusting the tube lens, the optical element, or the collimating optics;
wherein the following steps are carried out repeatedly:
an optical section of a sample is scanned by means of the scanner; and
the focus position is subsequently adjusted by adjusting the tube lens, the optical element, or the collimating optics; and
wherein a movement of the scanner is influenced based on a given correction value for an imaging scale of the adjusted focus position in such a way that different imaging scales are compensated for during recording of optical sections and all of the optical sections of the sample are recorded with approximately the same imaging scale.

12. The control method according to claim 11;
wherein an amplitude of the movement of the scanner is adapted to an imaging scale of the focus position when the movement of the scanner is influenced based on the correction value.

13. The control method according to claim 11;
wherein a plurality of discrete focus positions are adjusted step by step over a depth range of the sample and, in each focus position, a respective optical section is scanned as part of a stack recording.

14. A non-transitory memory storage unit which stores a computer program that carries out the method according to claim 11.

* * * * *